United States Patent [19]

Heining et al.

[11] Patent Number: 4,763,058
[45] Date of Patent: Aug. 9, 1988

[54] METHOD AND APPARATUS FOR DETERMINING THE FLUX ANGLE OF ROTATING FIELD MACHINE OR FOR POSITION-ORIENTED OPERATION OF THE MACHINE

[75] Inventors: Hans-Dieter Heining, Rednitzhembach; Albert Wick, Baiersdorf, both of Fed. Rep. of Germany

[73] Assignee: Siemens Aktiengesellschaft, Berlin and Munich, Fed. Rep. of Germany

[21] Appl. No.: 938,022

[22] Filed: Dec. 4, 1986

[30] Foreign Application Priority Data

Dec. 4, 1985 [DE] Fed. Rep. of Germany ....... 3542941

[51] Int. Cl.$^4$ ............................................. H02P 5/40
[52] U.S. Cl. .................................... 318/807; 318/798; 318/803; 324/158 MG
[58] Field of Search ................ 318/803, 805, 807–811, 318/798, 806; 324/158 MG

[56] References Cited

U.S. PATENT DOCUMENTS 3,775,649 11/1973 Bayer et al.
3,909,688 9/1975 Blaschke et al. .................... 318/700
4,626,761 12/1986 Blaschke ............................ 318/803

OTHER PUBLICATIONS

Jansch, et al, "A Fast Response Technique for Measuring and Recording the Load Angle of Synchronous Machines", J. Phys. E. (G.B.) vol. 4, No. 1, Jan. 1971, pp. 43–45.

Primary Examiner—David Smith, Jr.
Attorney, Agent, or Firm—Kenyon & Kenyon

[57] ABSTRACT

For establishing the field direction without mechanical pickup upon startup of a rotating field machine, e.g., in permanent excitation, a high-frequency component (iz*) is impressed on the stator current or on the stator voltage. Thereby high-frequency voltage components (or current components) are coupled into the stator windings, the envelope curves of which are correlated to the position of the field axis of rotor axis. Preferably the components of a model vector (FM) which also contain high-frequency components are calculated by a flux computer (60). The high frequency components isolated in a filter (61) are correlated in a means value former (62) to the components of the direction vector (fx). Thereby a field-oriented operation of a synchronous machine is possible.

21 Claims, 6 Drawing Sheets

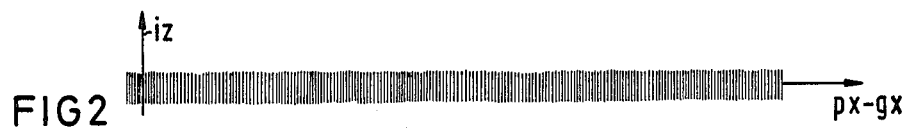
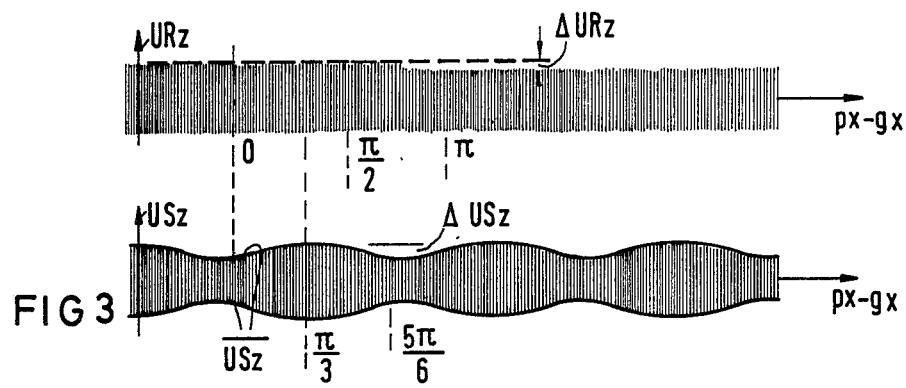
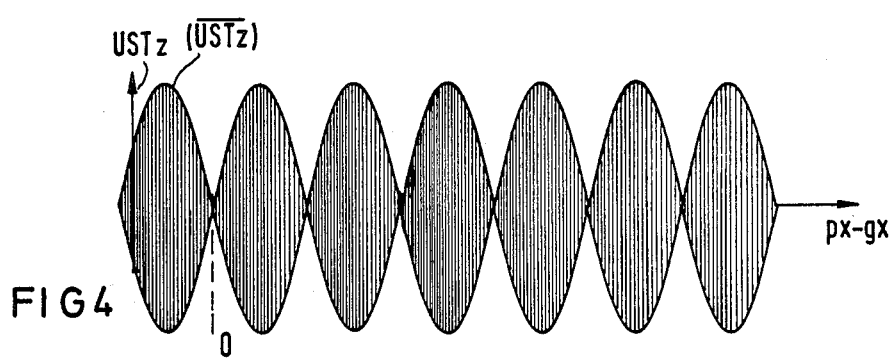
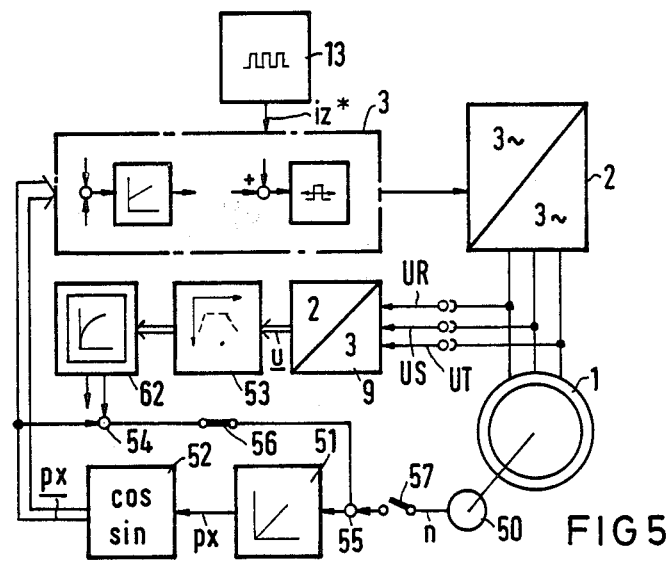

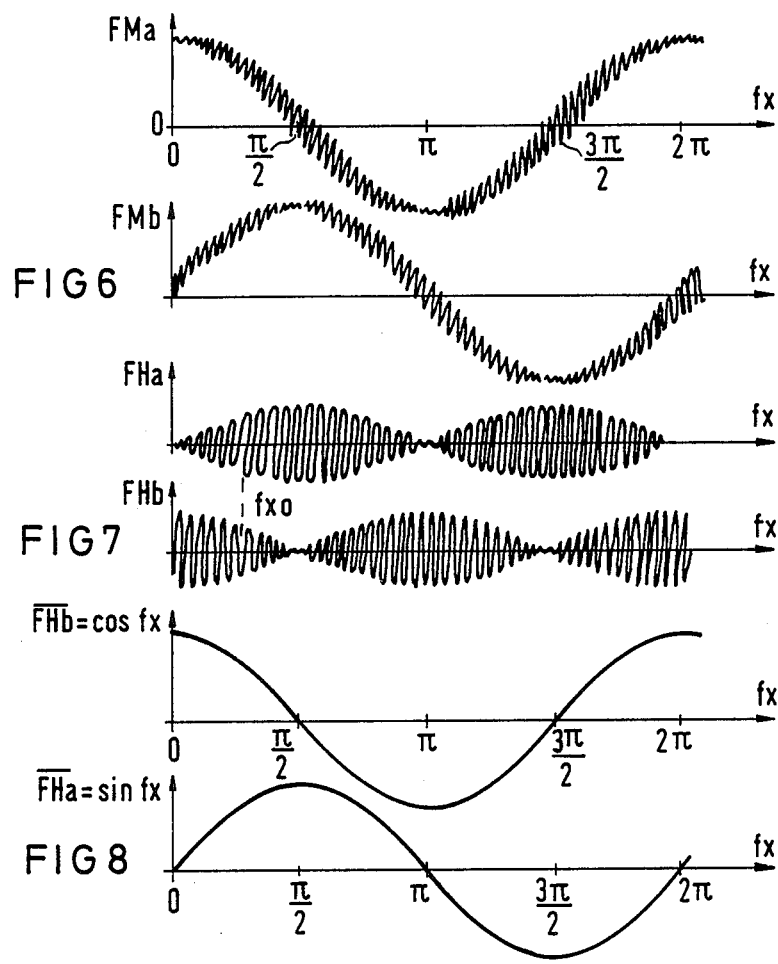
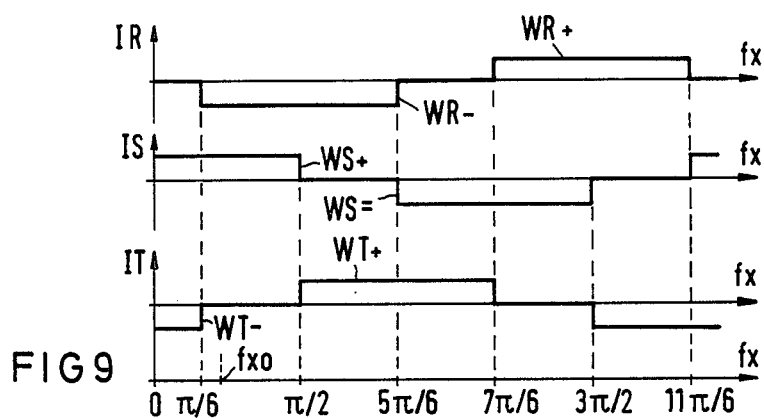

METHOD AND APPARATUS FOR DETERMINING THE FLUX ANGLE OF ROTATING FIELD MACHINE OR FOR POSITION-ORIENTED OPERATION OF THE MACHINE

BACKGROUND OF THE INVENTION

1. Field of the Invention

This invention relates to a method for determining the flux angle of a rotating field machine upon starting, or respectively, a method for the position-oriented operation of a rotating field machine by means of a position transmitter which established the direction vector of a rotating reference system. The invention further relates to an apparatus for carrying out the method.

2. Description of the Prior Art

From DE-PS No. 21 32 178 a dynamic optimum control of a synchronous machine is known, in which a transmitter calculates from electrical parameters of the machine the stator-related components of a model vector describing the flux, the direct of which established a direction vector pointing in the direction of the field axis. A set value for the field-normal component of the stator current vector, taken off e.g. at the output of a speed governor, as well as a set value for the field-parallel component which indicates the magnetization to be supplied by the stator, determine a ("field-oriented") nominal vector—referred to this direction vector—for the stator current of the machine, from which by means of the direction vector a control vector is determined with which a (static) frequency converter is controlled and a corresponding stator current is impressed on the machine.

As a transmitter a so-called "voltage model" is often used which calculates the flux as an integral function of the EMF, i.e., as integral function of the voltage signal, less the ohmic and inductive voltage drops in the stator. At low speeds, however, the voltage model furnishes only an imprecise signal, and d-c voltage components occurring in the voltage measurements as faults, as well as integration errors in actual integrators lead to faulty determinations. Therefore, a field-oriented operation with a voltage model is possible only at higher frequencies. Besides, for the integration of the EMF the integration constant must be set by presetting a start value.

Instead of the flux direction it is possible in some cases to use as direction vector the axis of the EMF vector, which in the stationary case is rotated 90° relative to the field axis. While the integration can then be eliminated, here too a sufficiently accurately controlled operation at low speeds is usually not possible. Instead it becomes necessary to find a different way to determine the direction vector.

A so-called "current model" simulates the processes by which flux is generated in the rotor, from instantaneous values of the current and the rotor position. For this, however, a mechanical pickup is needed for determining the rotor position. While this expense may be reduced by using an incremental speed sensing from another non-position-coded transmitter, as for instance a simple tachometer, at standstill or slow running of the machine the rotor axis must then be picked up ("located") in a different manner. This locating is often costly even with position-coded mechanical transmitters.

It is desirable to reduce the cost of determining the direction vector even when the operation of the synchronous machine is not exactly oriented on the field axis, but on the rotor axis, a high dynamic range being dispensed with. Thus, an approximate value for the armature reaction can be calculated for example from the set values of the stator current, in order to rotate the stator current vector relative to the rotor axis by a load-dependent nominal angle value which takes into consideration the angle between field axis and rotor axis. But then again only the determination of the field axis is reduced to a determination of the rotor axis; the difficulties of rotor localization at low speeds are not eliminated thereby. The approximate value for the armature reaction can be calculated for example from the set values of the stator current, in order to rotate the stator current vector relative to the rotor axis by a load-dependent nominal angle value which takes into consideration the angle between field axis and rotor axis. But then again only the ddetermination of the field axis is reduced to a determination of the rotor axis; the difficulties of rotor localization at low speeds are not eliminated thereby.

For machine tools, step motors and other areas of application, synchronous machines with a permanently excited rotor have proved successful. The armature reaction is negligible in such machines, so that rotor orientation becomes practically identical with field orientation and purely mechanical rotor position transmitters can be used as transmitter. However, here too, for correct starting the initial position or orientation of the rotor should be know, that is, for proper starting the rotor position transmitter must be set to the correct starting value.

This problem of rotor orientation thus occurs in particular in rotating field machines which have in the rotor definite preferential directions, including for instance reluctance machines. It can be solved in machines which have a separate exciter winding during standstill and calculating from the voltage induced in the stator the flux building up, which then points in the direction of the rotor axis. With permanent excitation, however, this possibility does not exist, nor would it solve the difficulties occurring at low speeds.

For field-oriented operation of asynchronous machines the voltage model is not feasible at the low speeds for position determination of the flux vector, while the current model shows the same problems linked with rotor localization, so that here too a costly mechanical transmitter may often be necessary.

Even non-field-oriented controls, such as a slip control or other characteristic-based controls, are usually based on the rotor position as the direction vector for the control of the stator current and require a mechanical position transmitter.

Lastly the invention is also largely independent of how the electric power supply to the machine is controlled. Thus, for example, when using an intermediate link converter, the intermediate circuit voltage can very well be impressed by a control voltage, and then e.g. a regulating and control unit can convert a set value for the stator current amplitude as command variable into the respective control signal for controlling the intermediate link voltage.

A special problem is the determination of the rotor position at start-up of a double-fed asynchronous machine. In this technology the rotor windings and the stator windings are connected in series, and the stator current flows also through the rotor. This takes place by means of slip rings, which also necessitate a change of the phase sequence. The stator current vector and its position relative to the stator is therefore equal to the rotor current vector and the relative position thereof to the rotor, the rotor rotating at double the stator frequency. Thus, with the determination of the rotor position also the position of the field vector is determined and vice versa. As a result, control is especially simple, in particular when field orientation is used.

If, without prior knowledge of the rotor position, a current is fed into such a double-fed asynchronous machine, the motor develops a torque not predictable as to magnitude and sign, and an uncontrolled movement of the rotor in one or the other direction must be reckoned with.

SUMMARY OF THE INVENTION

It is the object of the invention to determine the position of the direction vector, which vector is needed in a field-oriented or rotor-oriented operation of a rotating field machine (asynchronous machine or synchronous machine) and is given by the position of the rotating field axis or rotor axis, by using essentially electrical means. In particular for permanently excited synchronous machines, double-fed asynchronous machines or in other cases where non-mechanical direction determinations have failed until now, a costly mechanical transmitter can be dispensed with.

This is achieved by impressing a high-frequency component on an electrical variable of the stator winding system. By electrical variables of the stator winding system are understood the currents and voltages in the various stator coils, and the axis of the coils on which the high-frequency component is impressed determine the direction of the impressed component. It is found that e.g. for an impressed high-frequency current in one or more stator coils also in the voltage of these coils and in the currents and voltages of other coils high-frequency components occur, the amplitude of which depends on the difference angle between the flux axis (or rotor axis) and the direction of the impressed component. Therefore, one determines from a state signal which simulates another variable of the stator winding system the amplitude of the high-frequency component; the desired direction angle is determined from the dependence of the picked-up amplitude on the given direction of the impressed high-frequency component.

This determination according to the invention, of the rotor angle or field angle can advantageously be developed for a method for operating a rotating field machine by means of an electric position transmitter, the output signal of which establishes the direction vector of a position-oriented reference system. If in this connection one understands by the electric state vectors of the machine of the stator current vector and the stator voltage vector, than a control vector referred to the stator is formed in this operation from a position-oriented nominal vector for one of the two electrical state vectors, from a supplementary nominal values—of high frequency relative to the rotation frequency of the reference system—for this state vector, and from the signals of the position transmitter. By means of this control vector a frequency converter is controlled which impresses on the stator windings the electrical state vector corresponding to the nominal vector and to the supplementary nominal value. From a signal simulating the other of the two electrical state vectors the high-frequency components are isolated, and from the envelope curves of the high-frequency components the electric transmitter forms the signals establishing the direction vector.

An apparatus of this kind has to advantage a voltage measuring element or other means for determining the stator voltages, a band pass or high-pass filter for isolating high-frequency components of the stator voltages, a mean-value generator to form the envelope curves of the high-frequency components, and means for determining the components of the direction vector from the envelope curves. Further, a control device is provided having an input for a presetting a command variable for the components of the stator current in a reference system dependent on the direction system, with a supplementary set value transmitter to generate a high-frequency supplementary set value, and with an output at which a control signal for the stator current can be taken off. A static converter then impresses on the stator of the machine a current corresponding to the control signal.

BRIEF DESCRIPTION OF THE INVENTION

The invention will be explained more specifically with reference to the figures.

FIG. 2 shows a current signal formed by a high-frequency supplementary set value;

Figure 10:
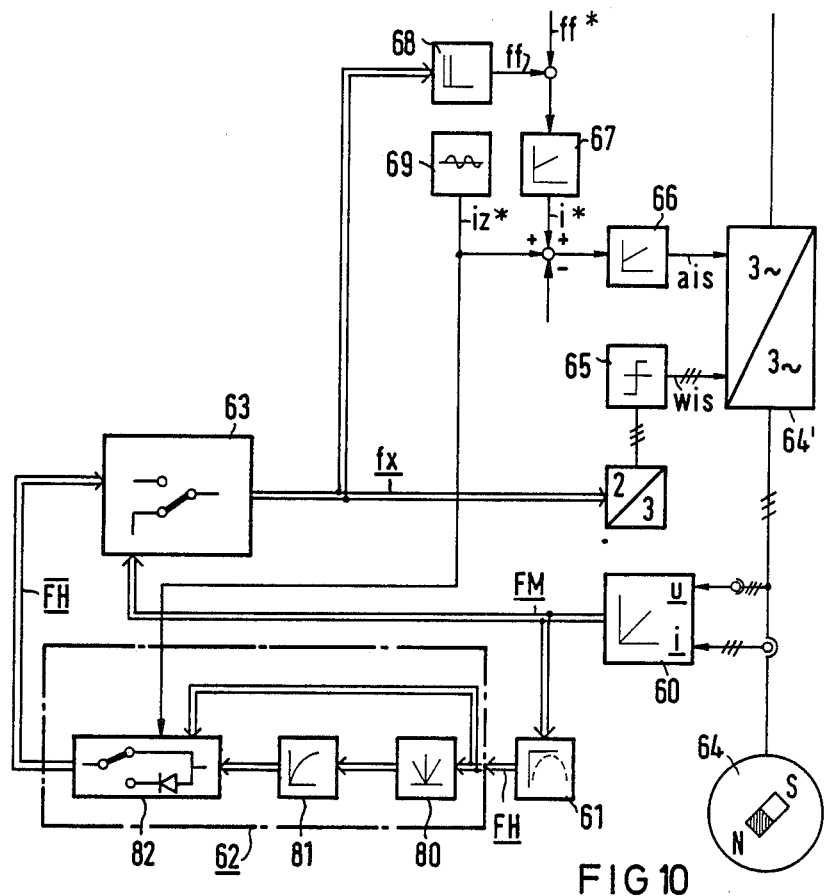
Figure 11:
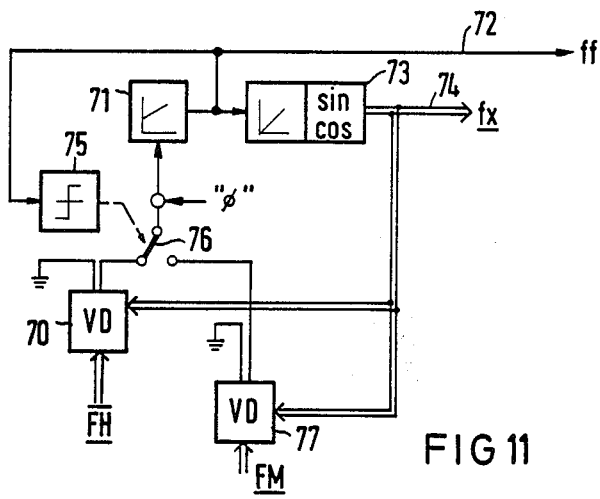
Figure 12:
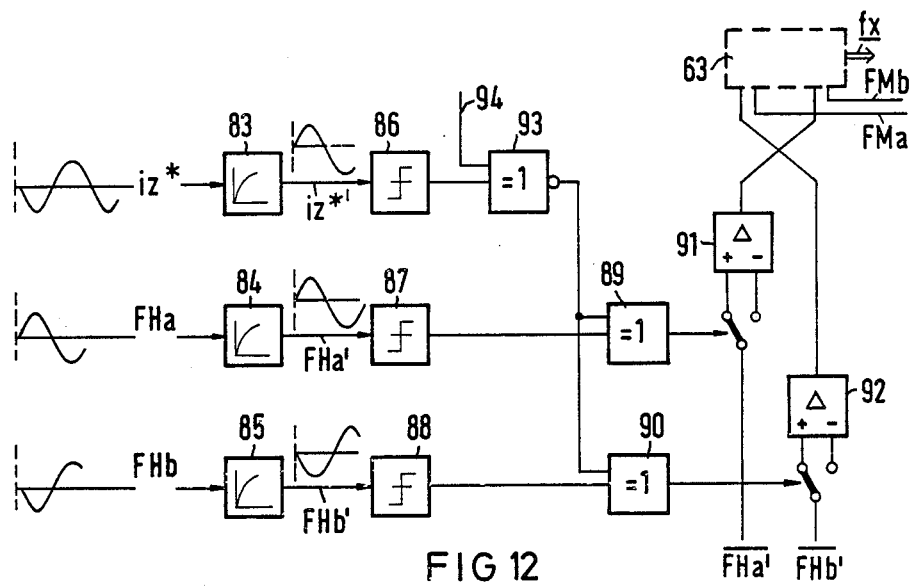
Figure 13:
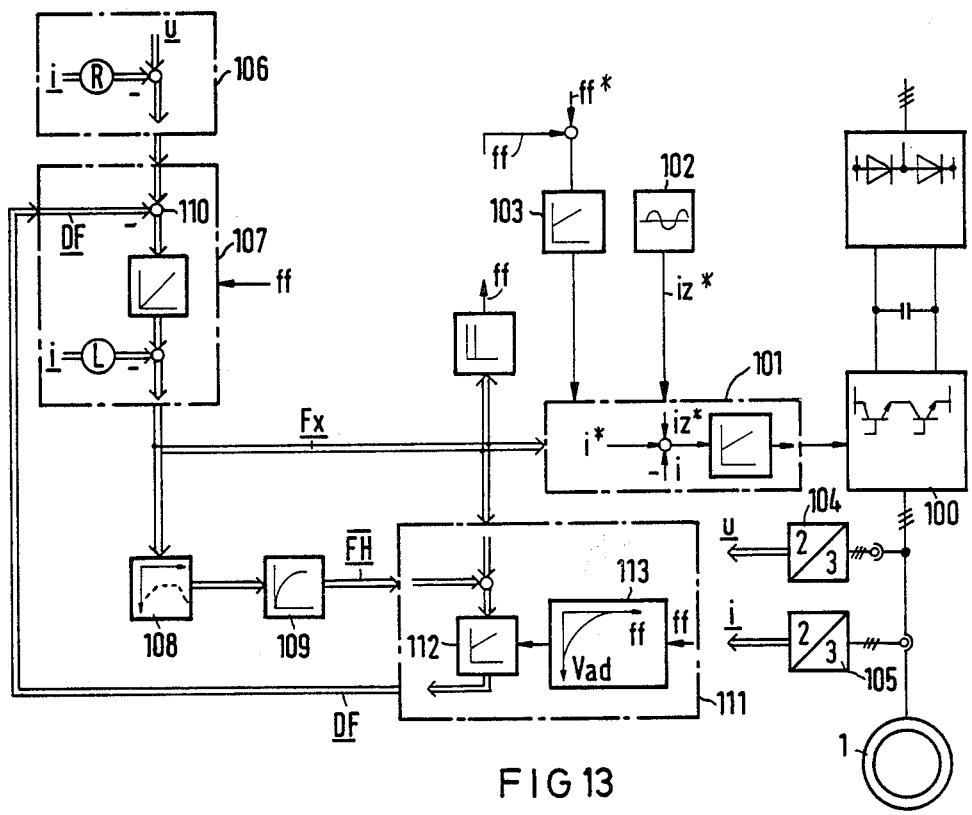
Figure 14:
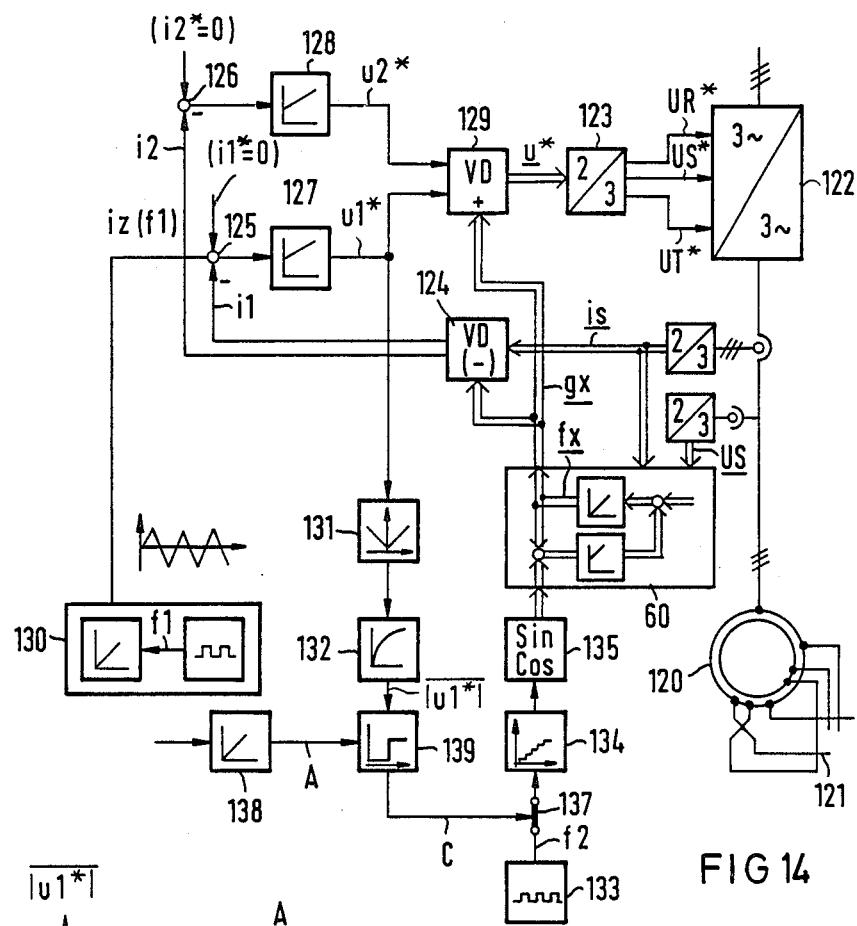
Figure 15:
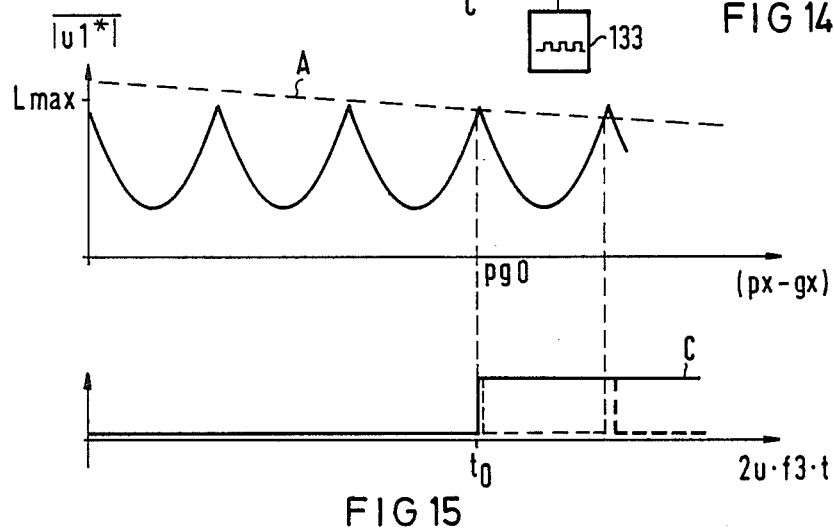

FIGS. 3 and 4, the high-frequency components of the stator voltages corresponding to FIG. 2;

FIG. 5 shows a first embodiment of the invention;

FIG. 6 shows the calculated components of the model vector according to the invention describing the flux;

FIG. 7 shows the high-frequency portions of the components from FIG. 6;

FIG. 8 shows the stator related components of the direction vector;

FIG. 9 shows the digital clock and control signals derived from the components of the direction vector, for commutation of the stator current;

FIG. 10 shows a simple arrangement for operating a permanently excited synchronous machine also at low speeds;

FIG. 11 shows a vector filter used in this connection;

FIG. 12 shows a device for inversion of the rectified high frequency components;

FIG. 13 shows an arrangement for operating a synchronous machine with measures for the rotor localization according to the invention;

FIG. 14 shows an apparatus for determining the flux angle of a double-fed synchronous machine at standstill before startup; and FIG. 15 shows various signals occurring in the apparatus of FIG. 14.

DETAILED DESCRIPTION OF THE INVENTION

Figure 1:
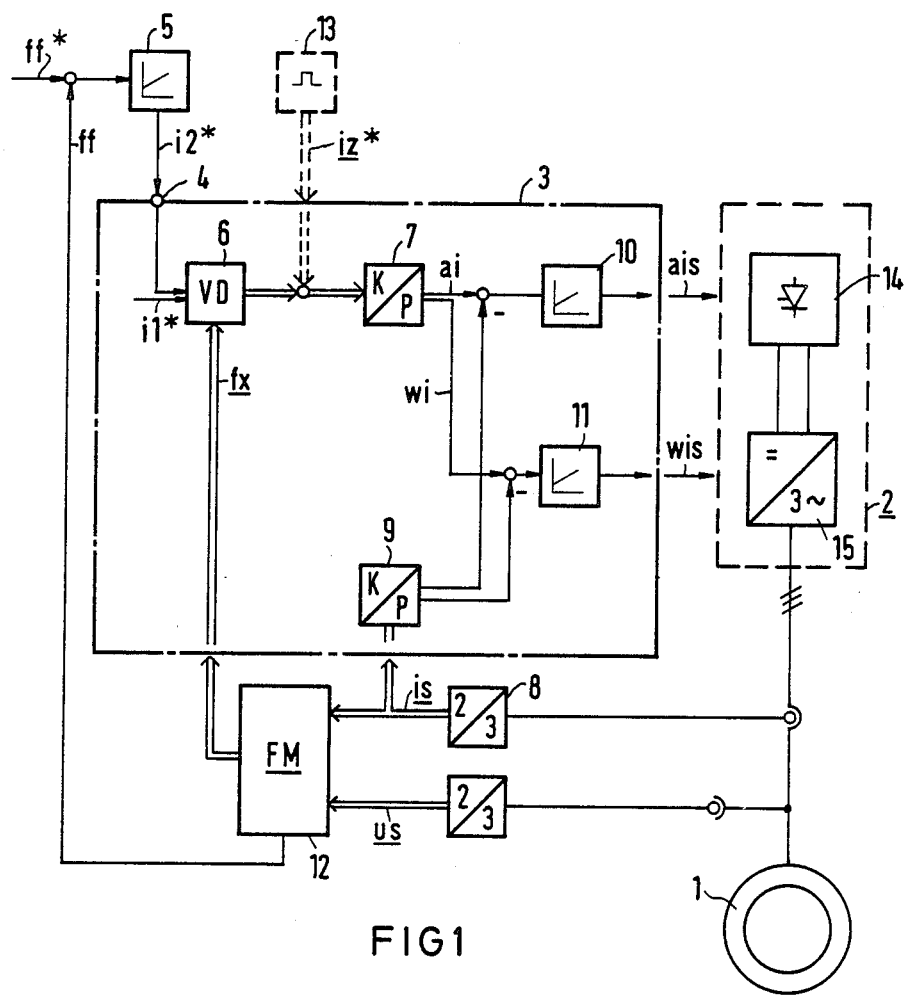
FIG. 1 shows the general principles of a field-oriented control with reference to a control structure in accordance with the invention.

In FIG. 1, the stator winding of a rotation field machine 1 is fed by a static converter 2 with a stator current of variable amplitude and frequency, which is determined by a control device 3. To this end, there is supplied to one input 4 of the control device 3 a set value i2*, generated by a frequency regulator 5, for the field normal component of the stator current, while a corresponding set value i1* for the field parallel component is chosen according to the magnetization to be provided by the stator, and therefore, in particular for a permanently excited synchronous machine fed only with active current in the stator, is set at i1*=0. In the latter case, a constant flux can be obtained by an exciter current control not shown, it being possible to calculate the exciter current in known manner from the set value for the active current, the set value for the power factor, and from the desired flux. In the case of an asynchronous machine, i1* is set proportional to the desired flux.

The nominal vector i* present in field orientation by i1* and i2* must, however, be transformed into the stator-related coordinate system and, in case of current control, must also be compared with the actual value of the stator current, in order to get a stator oriented control vector and to establish the amplitude and phase of the stator current to be supplied by the frequency converter 2. In FIG. 1, firstly the coordinate transformation is carried out, which corresponds to a rotation of the nominal vector by the flux angle fx. Since in general vector quantities are best processed in the form of Cartesian components, the flux angle fx is transmitted as a vector signal fx over a two-wire line for the two stator-related components fa=cos fx. fb=sin fx of a direction vector parallel to the flux vector. Coordinate transformations are then executed by vector rotators.

Hence the vector rotator 6 then supplies the stator-oriented current vector, which is converted by a coordinate transformer 7 to its polar coordinates, namely the current amplitude ai and the current phase wi.

The three phase currents which correspond to the phase-shifted components of the actual stator current vector are transformed by a ⅔ coordinate transformer 8 into the Cartesian components of an actual stator current vector is., from which components a coordinate transformer 9 supplies the corresponding amplitude and phase values. An amplitude regulator 10 as well as a phase regulator 11 then supply the polar components of a control vector with which the amplitude ais and the phase wis of the static converter output current are controlled.

For the generation of the direction vector fx, a transmitter 12 is required. The latter often a flux calculator, which calculates from the electrical parameters of the machine the stator components FMa and FMb of a model vector FM describing the flux. In the present case one uses as electrical parameters in particular the stator current vector is taken off at the ⅔ converter as well as the vector us for the stator voltage taken off at a corresponding ⅔ converter. The flux, in fact, is given as the integral function of the EMF, that is, at sufficiently accurate parameter values r for the stator resistance and L for the leakage inductance it can be calculatd as $$\int (us - r \times is) \, dt - L \times is.$$

In the state of the art, the model vector FM thus mathematically determined, which with respect to a fixed stator axis described the angle fx=arc tan FMb/FMa, can be converted into the direction vector fx, and further also the field frequency ff, i.e., the time derivation of the field angle fx, can be formed, in order to be compared at the actual value input of the frequency regulator 5 with a corresponding frequency set value ff*.

As has been mentioned before, an electrical transmitter 12 based on the "voltage model" permits field-oriented operation of the rotating field machine 1 only at higher frequencies. This is independent of the internal construction of the control device 3. Thus, for example, the actual current vector is can be transformed into the field coordinate system by means of a vector rotator, and after conversion into polar coordinates, the deviation for the amplitudes of the vectors i* and is furnishes the amplitude ais of the control vector, while the deviation of the angles furnished the corresponding control variable wis for phase and frequency of the frequency converter. Alternatively, there may be formed the deviation of the field-oriented or stator-oriented Cartesian components, which then furnish the Cartesian components of the control vector.

Now, according to the invention, it is provided to superimpose a high-frequency component on the stator current by means of a supplementary nominal vector is* of high frequency relative to the frequency of the reference vector. The addition to the known apparatus needed for this is shown in broken lines in FIG. 1, a supplementary set value transmitter 13 being provided. The superposition can be obtained by vector addition to the field oriented nominal vector i* or to the corresponding vector transferred into the stator-oriented coordinate system, or by another mathematically equivalent method.

Thus the control vector contains a component of correspondingly high frequency, which is impressed on the stator current via the static converter 2. The static converter 2 is here represented as a d-c actuator 14 at the d-c input of an inverter 15, a rapid adjustment of the current amplitude corresponding to the superposed high-frequency component being made possible through the amplitude actuating variable (sis). If the supplementary vector is* is a vector with rapidly variable direction, then also the actuating variable wis is variable correspondingly fast. However, a revolving supplementary vector is not absolutely necessary.

Further the electric transmitter is fed by measuring elements for the stator voltage, the signal of which are supplied, possibly via the flux computer, to a band pass or high-pass filter for isolating high-frequency components in the measured voltages. The envelope curves of the high-frequency components, which can be determined by an average value generator are correlated by suitable means to the components of the direction vector fx. The construction of the electrical transmitter 12 required for this will be explained later.

Since the underlying physical effect permits the current and voltage to the interchanged, the voltage and current of a stator coil are in the following referred to as the two variables of the coil the state variables of the coils as "state variables of the stator winding system", and the stator current vector and stator voltage vector as "state vectors of the stator".

The invention is based on the observation that a high-frequency component—impressed in one of the stator coils—of one electrical state variable induces a high-frequency component of the other state variable of the same coil and high-frequency components ofdthe state variables of the other coils. The high frequency components depend on the position of the rotor or field axis.

This surprising observation will be explained in an experiment where via the motor terminal R a current is (FIG. 2) of 250 Hg and an effective current amplitude of 4.2 A is supplied and removed via the neutral point. The axis of the coil traversed by this impressed high-frequency current is preset for this current a direction with the direction angle gx. Due to losses in this coil, a voltage drop occurs whose value, if the rotor is entirely rotation-symmetrical and carries neither a permanent magnet nor a winding, corresponds at first for example to about (URz)o=340 mV and indicates the component, parallel to gx, of the stator voltage vector. Also in the two other winding axes high-frequency components of the voltages occur, e.g. (USz)o approx. 100 mV.

Due to their geometric arrangement whereby they overlap in their edge regions, the stator windings are cross-coupled inductively. Under the conditions referred to, the coupled-in voltages cancel each other out between both of the other windings in the high frequency component (USts) of the mest voltage, i.e. (USTz)o=0. Here (USTz) represents the other component of the voltage vector.

If a pronounced air gap flux exists, however, in that, for instance, a permanent magnet is applied at the rotor, the voltage URz for the came coil according to FIG. 3 is dependent on the difference angle px-ex, which therefore can be determined, at least theoretically, from the amplitude of the magnitudes URz. The minima and maxima occur when the flux is oriented in the same or the opposite direction as the saturation of this coil (flux angle fx=0, pi, ... ). With the design and rating of the usual machines, this position-dependent ratio between the two state variables of a single coil is low, however, being for example AURz/(URz)o approx. 6%.

The same saturation or desaturation is brought about by the flux at fx=pi/3, 5pi/3, (where pi=$\pi$) . . . and also in the overlap regions of the windings R and S, and therefore the voltage USz at coil S shows the indicated dependence on the field angle fx with USz/(USz)o approx. 30%.

For the voltage UTz there applies a curve phase-shifted by 2pi/3, so that for USTz and the corresponding component of the voltage vector there results the dependence of FIG. 4. The envelope curves USTz therefore show pronounced extreme with USTz-/(URz)o being about 10%.

Position-dependent envelope curves of high-frequency components, the amplitudes of which permit determining the difference angle px-gx, are obtained also when high-frequency voltages instead of the current iz are impressed in one coil.

If there is no neutral point of the stator windings, or if the neutral point is not connected, the high-frequency current iz always flows through several windings, and somewhat different conditions will result. But even then it is possible to determine the position of the field angle of a permanently excited synchronous machine from the voltages, in particular from the envelope curves of the high-frequecy portions in the Cartesian components of the voltage vector. This is true also for asynchronous machines whose rotor winding is in general rotation symmetrical and whose flux is induced by the stator current.

In salient pole machines, synchronous machines with exciter winding, and other machines with unsymmetrical rotor, another factor is that the stator windings are coupled with one another via active rotor inductances which depend on the relative position between rotor and stator. Also, the stator currents themselves bring about in the exciter winding currents which flow in the direction of the rotor axis and have an additional coupling effect on the stator windings. In analogy to armature reaction, the envelope curves of the high-frequency stator voltage components must then, depending on the operating state and layout of the machine, be correlated, not to the field axis, but to the rotor axis.

As a first application of the method, there is considered in FIG. 5 the start of a rotating field machine 1, the frequency converter 2 of which is controlled by a controlling regulating device 3 as a function of the rotor position, and the rotational speed n of which is picked up by a simple speed pickup 50, with a connected integrator 51 and function generators 52 for the formation of the components cos ($\int$n dt), sin ($\int$n dt) of the direction vector px for the rotor position.

There may be involved here a permanently excited synchronous machine whose rotor angle px is equal to the field angle fx and which according to the control device 3 of FIG. 1 is operated field-oriented. Alternatively, there may be involved an asynchronous machine operated field-oriented, the control device of which contains a current model for the determination of the field angle fx at low speeds, and in which, therefore, the rotor position must be set also. Or there may be involved e.g. a slip control of an asynchronous machine or other rotor-oriented adjustment or control of a rotating field machine. In all cases the integrator 51 must be set, upon starting to the value px corresponding to the actual rotor position.

For starting from standstill, a nominal vector can be preset in a coordinate system oriented to the direction vector px for example by the set values i*$_1$=0 (or also i*$_1$=const), i*$_2$=0 from which the device 3 forms in some manner a control vector pointing in px direction for the control of the frequency converter 2. But since the integrator 51 is at first at any random value pxo, the frequency converter is started with a correspondingly random direction to its output current. In this random direction pxo the supplementary set value transmitter 13 (set value iz*) impresses the high-frequency current iz, and the voltages UR, US, UT measured at the machine terminals, which are converted by the 3/2 converter 9 to the components of the voltage vector $v$, consist practically only of high-frequency components according to any point of the abscissa in FIG. 3.

These high-frequency components (here: the high-frequency portions in the components of the voltage vector $v$) are isolated in a filter 53 from d-c components, e.g. from the d-c voltage errors of the voltage measuring elements, and an average former 62, the design of which will be explained later, correlates the envelope curve of these high-frequency components to the wanted components of the direction vector.

Therefore, the integrator output signal px can now be set to the correct angle value. In the example of FIG. 5 this is done in that the deviation of a Cartesian component is formed as a measure of the angle deviation of the integrator output signal from the actuator direction angle at the comparison point 54 and is locked onto the integrator input at a point 55. Thereby px is adjusted to equality of the angles.

In the synchronous machine, therefore, the direction vector px, which in standstill describes the rotor axis and the field axis simultaneously, is thus localized. And since the frequency converter 2 had been started as a function of px, the direction of the impressed current vector is now set to the value belonging to px. In ab asynchronous machine, where in standstill the field axis points in the direction of the stator current and the rotor axis plays a secondary role, the current vector occurring when the frequency converter is started is in the end localized by this process.

After this localization, a torque can be impressed on the machine 1 by raising the set value i2*, and the speed n taken off at the speed pickup 50 now determines the change of direction of px by closing the switch 57. The element- 9, 53 and 62 according to the invention can then be disengaged by opening switch 56. However, if the actual speed n is imprecise at low rotational speeds and/or if the integrator 51 contains integration errors, it may be more advantageous to actuate the switches 56 and 57 only at higher speeds, at which the determination of the envelope curves and their correlation with the components of px could lead to difficulties.

In principle, the mechanical pickup may be omitted altogether or be replaced by an electrical transmitter utilizing the voltges, in particular with the use of a flux computer. While the voltage URz in the coil traversed by high-frequency current is then little dependent on the rotor position (FIG. 3), the other voltages (FIG. 4), in particular the mesh voltage (i.e., the component of the voltage vector perpendicular to the current vector), permit within their periodicity a better correlation of their envelope curve with the angle px. If, therefore, only the voltages are evaluated, then appropriately only the voltages at the windings on which the supplementary set value of the current does not act are used, and whenever in the static converter the current flow direction is relayed, also the determination or the evaluation of the envelope curves is relayed.

Now since the flux is linked with the EMF and therefore current proportional voltage drops are being compensated already, there results the simplified method explained in the following figures, which has been confirmed experimentally on a machine whose rotor contains no winding of any kind.

In fact, a high-frequency component in the stator current generates practically no signal at the output of the voltage model in a machine whose rotor neither shows a geometric asymmetry nor is traversed by a constant flux.

Now if by applying permanent magnets or by an appropriate current-traversed winding a constant flux is produced in the rotor, one obtains the curves shown in FIG. 6 for the components FMa, FMb of the model vector FM computed in the voltage model and describing the flux, as soon as the rotor is moved mechanically by its coupled load. Depending on the field angle fx, the curves have a cosine and sine form in accordance with the field frequency, each having a high-frequency component superimposed on it in accordance with the impressed supplementary high frequency. If these high-frequecy components are isolated from the fundamental wave, there result the components FHa and FHb of FIG. 7.

After a phase shift of 90° the envelope curves FHa and FHb coincide with the fundamental waves of FMa and FMb, i.e., they are equivalent to the Cartesian components of the direction vector fx. The envelope curves represent the amplitudes of the high frequency components FHa and FHb averaged over a half period of the high frequency.

If, therefore, especially for the formation of the envelope curves FHa and FHb the isolated components FHa and FHb are rectified, smoothed, and weighed with a sign which changes after each zero crossing, these values FHa and FHb indicate the stator-oriented Cartesian components of a direction vector perpendicular to the field axis. The components fa and fb of the direction vector fx pointing into the field axis itself are in this mannner correlated to the main values FHb and FHa (FIG. 8).

Now the advantage of forming the model field angle fx from the components FHa and FHb is that the correlation of FHa and FHb to the field vector fx illustrated in FIG. 8 is preserved even at low rotation frequencies to standstill, although as a rule the rotation-frequency fundamental wave of the components FMa and FMb differs from the correct correlation to the field vector fx as shown in FIG. 6, because of the calculating error of the flux computer.

For the simple case that, for a synchronous machine with trapezoidal EMF ("brushless d-c machine"), an input d-c (constant except for the superposed high-frequency component) is switched through by the static converter ("Electric commutator") in current blocks each of a length of 120° after each rotor rotation by 60° el to the next stator windings of the synchronous machine, the clock and control signals WR+, WR−, ... WT-shown in FIG. 9 for the actuation of the inverter valves can be formed by appropriate limit indicators for the components fa and fb. They control the current vector is so that it assumes intermittently in succession six stator-related angles wis, while its direction relative to the field axis is always 90°±30° el.

In the embodiment example of FIG. 10, the electric transmitter consists of a series connection of a voltage model 60, of a bandpass filter 61 (or high-pass filter) tuned to the high frequency (e.g. about 250 Hz) and of a mean value former 62 which, according to the switches 56 and 57 (FIG. 5), may be followed by a structural element 63, in particular is, for relatively high speeds of the permanently excited synchronous machine 64, smooth switching from the direction vectors determined according to the method to the vector determined by the voltage model 60 is intended.

The direction vector fx thus formed is broken down by means of a ⅔ converter into its oblique-angle components, which correspond to the projections of the rotor axis onto the three winding axes of the stator. An angel discriminator 65 sees to it that the current in the stator windings is stopped by 60° el after each rotor movement. This takes place with the clock and control signals of FIG. 9, which correspond to the signal wis of FIG. 1.

The amplitude of the stator current is furnished by a current regulator 66, which compares the set value 1* taken off at a speed regulator 67 with the actual value is of the stator current amplitude. The actual value ff for the speed regulator can be formed as frequency of the direction vector fx by means of a differentiating circuit 68, and in the permanently excited machine it equals the rotor speed.

Now for the determining the stator position, a supplementary set value is* is made available by a supplementary set value transmitter 69 in the form of an approximately sinsoidal wave of 259 Hz and is locked into the amplitude of the control current via the current regulator 66.

During standstill of the machine (ff*=0, i*=0) the rotor position, that is, the direction of the rotor flux, is unknown. The direction vector fx furnished by the electric transmitter as a random value. Let it be assured, for example, that the direction vector Fx with the winding axis of the stator winding connected to phase R has the random value fx=0°, whereas the actual rotor axis has the (unknown) value fxo=40°. According to FIG. 5, the angle discriminator 65 presets by the control signals WS+WT-a valve combination in the static converter 64' at which the stator current preset by the amplitude actuating variable (sis) is fed into the winding S and removed via the winding T. This corresponds to an angle of the stator current vector relative to the R-winding axis of 90°. With the release of the supplementary set value transmitter 69, therefore, a stator current vector oscillating in 250 Hz time is impressed on the machine in this direction. The machine is unable to follow this high frequency and remains at standstill.

With the high-frequency supply, therefore the EMF induced by the permanent excitation should remain constant and the flux computer should show no variation of the model vector FM, which, upon starting, is at a randomly resulting starting value. The permanent excitation of the rotor, however, brings about a local saturation in the stator, which leads to different stator reactances with respect to the longitudinal and transverse rotor axes and to different magnetic cross-coupling of the individual phase windings.

Therefore, different high-frequency voltage components are coupled into the various stator windings, and the components of the calculated flux model vector FM show according to FIG. 7 the high-frequency components formed by amplitude averaging assume the values FHA=cos (fxo)=fb and FHb=sin (fro)=fa. These are the Cartesian components of a vector FH perpendicular to the rotor axis or respectively of a parallel vector fx. Thereby the correct starting value $fX0=40=$ for the associated direction angle fx is now formed, and for the static converter the control signals WR−, WS+ are determined (FIG. 9). If now the frequency set value ff* is increased and hence the mean value of the stator current amplitude is raised via the control device 66, 67, the rotor will start up slowly. After a rotation by 50° el, the control angle wis is then advanced in the static converter 64', and the machine assumes a rotation regulable by the speed regulator. As a result, the fundamental wave portion of the components shown in FIG. 6 increases in the components of the model vector FM calculated by the voltage model 60, but it is suppressed by the filter 61 with the formation of the high-frequency components FHa and FHb.

For higher frequencies, the voltage model 60 determines a model vector FM which gains in accuracy with increasing frequency and coincides with the direction of the actual field axis (rotor axis). Here, therefore, the synchronous machine operation according to the invention is intended only for the localization of the field angle at standstill and for operation at low speeds, while for higher speeds the direction vector fx is switched directly to the reference vector FM furnished by the voltage model. For this, the structural element 63 is used, which serves additionally as vector filter for the determination of the fundamental oscillation of the vector FH.

In such a vector filter, which is known e.g. from DE-OS No. 33 47 548, the components of a rotating vector are transformed into a rotating reference system by means of a frequency variable transformation element, for which purposes according to FIG. 11 the vector rotator 70 is provided, which is fed with the components FHa and FHb of the vector FH. A set value (e.g. the set value zero for a transformed vector component) established a desired phase shift between the rotating vector and the abscissa of the rotating reference system, where a phase difference regulator 71 forms, by leveling of this phase shift, the frequency of the frequency-variable transformation elements and thus causes the rotating reference system to follow the rotating vector synchronously. The rotation frequency of the reference system therefore corresponds to the fundamental frequency of the vector and can be taken off at an output 72 as actual frequency value ff, the transformation elements themselves being formed by means of a vector oscillator 73 as cos ($\int$ff dt) and sin ($\int$ff dt) and being returned to the angle input of the vector rotator 70 as well as being picked off as Cartesian components of the direction vector fx at an output 74.

Such a vector filter makes possible also the smooth switching of the operation from the vector FH to the model vector FM. To this end, the output signal of a threshold transmitter 75 switches, at a given limit speed, the switch 76 at the actual input of the controller 71 to the output of a vector rotator 77, which is fed by the model vector FM. During this switching, discontinuities of the direction vector fx do not occur.

To get from the high-frequency components FHa and FHb to the mean values FHa and FHb, the average former 62 of FIG. 10 contains a rectifier 80 which furnishes the instantaneous value of the high-frequency oscillations. Each instantaneous value is weighed in a following inverter circuit with a sign which changes after each zero crossing. Preferably, however, the range of sing is determined, not directly from the zero crossing, but from the phase of the high-frequency components with respect to the high-frequency supplementary set value. Preferably also a smoothing element 81 is connected in series, which has a small smoothing period approximately adapted to the high frequency and hence furnished, except for slight harmonics, the instantaneous amplitude of the envelope curves comprising the high-frequency components.

FIG. 12 shows the design of a suitable inverter circuit 82.

It is here assumed that at each zero crossing of their envelope curves the high-frequency components undergo a phase jump of 180°. If therefore, in a single adjustment it is established what phase angle the unsmoothed high-frequency components FHa and FHb have in relation to a constant high-frequency signal of equal frequency at a given rotor position, and with what sign the rectified components FHa and FHb must be weighted for the description of this rotor position, it suffices to check, when applying the method, whether the actually occurring phase shifts have this value, taken as basis for the adjustment, or whether they are shifted by 180°.

As high-frequency reference signal one can use in particular the supplementary set value is* itself. According to FIG. 12, delay elements 83, 84 and 85 are provided, the delay time of which is set in the adjustment in such a way that e.g. for a rotor axis which points in the direction of the R-winding axis and is described by the direction angle fx+0, the delayed, non-rectified component FHa' is in phase with the corresponding delayed supplementary set value iz*'. and the corresponding delayed non-rectified component FHb' is in phase opposition with is*'. For the further operation it then suffices to actuate a polarity switch 91 and 92 for the rectified high-frequency components FHa and FHb by polarity detectors 86,87 and 88 and respective EX.OR gates 89 and 90, in such a way that for sign iz*′=sign FHa′=—sign FHb′ the positive sign and at each change of sign a negative sign is preset.

Interchange of the polarity of the permanent magnets, i.e. a rotor axis rotated 180° al, brings it about at equal adjustment of the delay times, that the sign weighting of FHa′ and FHb′ must be interchanged. This can be done with an EITHER-OR gate 93 with negative output, which may be disposed between the detector 86 and the gates 89 and 90, and which by a sign reversal of the signal preset at its second input 94 causes a reversal of the sing weighting. The direction of the field having been established, the polarity thereof and hence the correct sign weighting can be found if the high-frequency current fed in field direction is provided with infreposed low-frequency current fed in field direction is provided with infreposed low-frequency current blocks. Depending on the polarity of the field, saturation phenomena are thereby simplified or attenuated, so that the correct polarity can be determined from the amplitude variation of the voltage coupled-in perpendicular to the field.

The components FHa and FHb obtained from FHa′, FHb′ by the sign weighting describe the vector FH perpendicular to the field axis and hence approximately on the model vector FM, so that the components FHb and FHa or respectively FHa and FMb correspond to each other and are correlated to each other at the inputs of the vector filter 63.

FIG. 13 illustrates how this method can advantageously be fitted in with the control structure shown in FIG. 1 of an apparatus for field-oriented operation of a rotating field machine 1.

To impress a stator current with a high-frequency component, it is advantageous to use as frequency converter a converter with impressed intermediate link voltage which contains on the machine side a pulse inverter 100. Pulse inverters composed of switching transistors permit exact control even of high frequencies. But often also an intermediate-link voltage converter with a machine-side thyristor inverter with forced quenching is usable.

The field-oriented control device 101 is advantageously constructed so that the set value is* of the supplementary set value transmitter 102 acts only on the amplitude of the control vector for the stator current. If, for instance, a mechanical pickup is to be dispensed altogether, the speed regulator 103 receives at its actual value input a frequency value ff derived from the direction vector fx. For the flux computer, which calculates the model vector from electrical parameters of the machine, there suffices in principle e.g. an EMF detector which is fed from the ⅔ converters 104, 105 with the vectors u and i for voltage and current. Preferably the EMF detector 106 furnished the integrator for an a-c voltage integrator 107. Such an a-c voltage integrator is described e.g. in German disclosure No. 28 33 593 and uses feedback signals for the suppression of d-c voltage components. Feedback signals with a frequency ff are used to adjust the feedback signals so that a frequency-independent phase shift occurs during the a-c voltage integration. In the circuit diagram of the EMF detector 106 and of the a-c voltage integrator 107 it is indicated further that the model vector for the flux is formed from the voltage vector by subtraction of the ohmic and inductive voltage crop.

At low frequencies, the vector FX at the output of the a-c voltage integrator 107 is per se faulty because of the imperfection of the voltage model. These errors, are however, compensated by a correction vector DF which is supplied to an element 110 for vector addition at the flux computer input, and which brings about that the model vector FX whose components determine at the same time the direction fx of the direction vector fs, is made to follow the fector FH formed according to the invention.

To this end, the filter 108 and a circuit 109 constructed according to the mean value former 62 are connected to the output of the flux computer 106, 107. The correction vector DF is then formed by an adaptive control stage 111 from the deviation FH -FX. A separate vector filter is usually not necessary here, as the vector FH sets on the formation of FX only via the integrator 107, which already constitutes a smoothing.

The function of switch 76 contained in the vector filter of FIG. 11 can be realized by a characteristics generator 113, which presets the amplification factor Vad for the deviation in the correction control 112 dependent on operation and in particular at increasing speeds continuously reduces the influence of the vector FH determined according to the invention. Thereby the control stage 111 is adapted to the operating state, and at higher speeds only the model vector determined in the flux computer 107 determines the direction angle.

If as frequency converter an intermediate link converter with impressed d-c current in the intermediate link or another current-impressing final control element is used, the control voltages at the input of the static converter control unit are a direct mathematical image of the static converter output current. Hence the stator current vector corresponds to the control vector furnished by the output of the static converters. In this case the high-frequency supplementary set value for the current can be locked on directly at the control input of the control unit. The high-frequency components of the voltage vector can then be obtained in the described manner directly from measured voltage values, to determine the position of the direction vector.

Often, however, it is desirable to use a voltage-impressing converter, e.g., a machine-side pulse inverter with preset input d-c voltage, where as control voltages nominal curves for the three machine-side phase voltages are preset and the control pulses for the valves of the pairs of bridge branches operating on a d-c voltage output are formed by pulse width modulation. In this case, therefore, the control voltages are an image of the pressed stator voltage vector, and according to the invention a high-frequency component of the stator voltage vector can be impressed directly at the control input of the control unit by a high-frequency oscillating supplementary vector and the direction vector can be determined from a measurement of the occurring high-frequency components of the current.

For the isolation and analysis of the high-frequency components it may, however, be more advantageous to start, not from the actual measured values at the static converter control unit. For a voltage-impressing converter this means that at the control voltages the stator voltage vector and its high-frequency components are determined. To generate this high-frequency component of the voltage vector, there is impressed on the stator windings a high-frequency of the current vector by means of a corresponding supplementary nominal vector at the input of the superposed current regulators, which are provided anyway in a position-oriented operating method.

This is explained in FIG. 14 in the example of a field-oriented double-fed asynchronous machine 120. By 121 are symbolized the slip rings which, interchanging the phase sequence, place the windings of the cage rotor in series with the stator windings. As voltage-impressing converter 122 there may be provided for example a direct converter or an intermediate link converter with a line-side rectifier and a machine-side pulse inverter. The control voltages UR*, US* and UT* for the control unit (not shown) of the converter are formed by means of $\frac{2}{3}$ coordinate converter 123 from the Cartesian, stator-related components of a control vector u*, which is practically identical with the stator voltage vector.

These components of the control vector u* are taken from a control device with two controllers for the field-parallel component (magnetization current) and for the field-perpendicular component (active current) of the stator current vector, the control circuits for these two current components being isolated from each other in a manner known to the specialist. In FIG. 14, this isolation is symbolized in that the actual values i1 and i2 for magnetization current and active current are taken from a vector rotator 124 for the stator current is obtained from measured current values ani are compared at comparison points 125 and 126 with the corresponding actual values i1* and i2*. The current controllers 127 and 128 form therefrom the set values u1* and u2* for the field-oriented components of the stator voltage vector, which by means of the vector rotator 129 is transformed into the stator-oriented components of the control vector u*.

For continuous operation it is assumed that the direction of the field axis with respect to the stator is described by the field angel fx or respectively the direction vector fx with the Cartesian stator-related components cos fx and sin fx. In continuous operation this direction angle is represented with sufficient accuracy by the model vector FM for the flux, which is determined by a flux computer 60 by integration of the EMF vector (formed from the stator current is and the stator voltage vector us) or by another, simplest possible pickup However, if the electronic control system is turned on with the machine standing still, the integrator of the transmitter 60 is at any random starting value.

On the other hand, if special conditions are set for the start-up of the rotating field machine, e.g., start-up with a multiple nominal torque ("hard start-up"), the correct position of the field vector at standstill and hence the correct rotator position should be known and hence the integrator set to the correct starting value.

To this end, according to the invention, the following search process is used, by which the desired direction vector is determined before operational start-up. The physical fundamentals of this search process are set forth once more below.

At standstill there applies between the stator current vector i and the stator vector u generally the vector equation $$u = R \times i + Lx \, (di/dt)$$

where L represents an inductance matrix whose elements are functions of the operating parameters, in particular of the stator current vector and of the position of the flux vector and rotor. If with the current supply a direction vector x for the stator current with the stator-related direction angle gx and a quantity i1(f1) is preset which oscillates at a high frequency f1 without possessing a d-c component, the rotor remains immobile, and in a coordinate system referred to gx there results the equation $$\begin{bmatrix} u1 \\ u2 \end{bmatrix} = R \begin{bmatrix} i1 \\ 0 \end{bmatrix} + \begin{bmatrix} Li1 & L12 \\ L21 & L22 \end{bmatrix} \begin{bmatrix} di1(f1)/dt \\ 0 \end{bmatrix}$$

The matrix elements Li1 and L21 are here functions of the difference angle px−gx and indicate what the independence is of the voltages occurring at the stator coils or respectively the components u1 and u2 of the voltage vector with the derivation di1(f1)/dt of the impressed high-frequency current component. A similar equation results also in the case that in direction gx a high-frequency voltage is impressed, with which corresponding high-frequency components of the current or of the derivation of the current are then cross-coupled.

The component containing the ohmic stator resistance R can, in principle, be mathematically eliminated or can be neglected here for the further analysis.

For the averaged amplitude of the voltage vector $$|\overline{u}| = \overline{|L11^2 + L21^2|} \times |\overline{di1(f1)/dt}|$$

for example, there results then a proportionality with the mean value of the time derivation of the current, the proportionality factor being dependent, however, on the difference angle px−gx. This difference angle can therefore be determined from the particular value of the proportionality constant, which can be measured by determination of the voltage.

In the embodiment according to FIG. 14, the direction of the impressed current is given by the direction vector fx, which before localization of the rotor position has at first the arbitrary start value gx (i.e., fx=gx). With the current set value i2*, to keep the current component perpendicular to gx at zero, while via the current regulator 127, e.g., the current amount if $(f1) = ix0 \cos(2\pi f1\,t)$ is impressed hence a current vector:

$$i = is = is\,0\,\cos(2\pi f1\,t)\,gx.$$

In the embodiment of FIG. 14 a high-frequency generator 130 is provided for this purpose which by integration of a pulse frequency f1 produces, instead of a sinusoidal high frequency, a high-frequency delta voltage is (f1)*. Neglecting the ohmic component, said vector equation thus gives for the averaged parallel components of the position-oriented voltage vector.

$$\overline{U1} = L11] \text{pi}\,f1\,|iz(f1)^*|$$ proportional to L11 f1 iz0. The component u1* of the control vector parallel to ox, furnished by the current regulation, is practically proportional to the corresponding component of the actual voltage vector.

From this $|\overline{u1}^*|$, i.e., the amplitude of the high-frequency component, is determined by means of a rectifier 131 and a smoothing element 132.

For certain difference angles between rotor axis and impressed current vector, the inductance is determined mainly by the leakage inductances of the stator and rotor coils, while for other positions the principal and coupling inductances of the two winding systems additionally occur, so that there result minimum and maximum in the proportionality between the voltage amplitude and the current amplitude, which may differ by a factor of 20 to 50, depending on the model. This marked dependence of the inductances on the difference angle between the impressed high-frequency component and the rotor axis thus leads to an equally strong dependence for the detected amplitude $|\bar{u}1^*|$ of the high-frequency component, as FIG. 14 shows. Hence the rotor angle can be determined by measurement or determination of the amplitude as a function of the difference angle between the impressed high-frequency component iz* and the rotor axis.

For this it suffices to rotate the vector ox slowly, e.g., at a low frequency f3. Thereby the difference angle px−gx is varied continuously (steadily), and the amplitude $|\bar{u}1^*|$ shows a response which corresponds to the dependence of the inductance Li1 on the difference angle and shows pronounced maxima, e.g., at difference angles pg0 (FIG. 14). If during the rotation of the direction vector ox the amplitude assumes value at a direction angle gx=gx0, then also—except for the periodicity—the difference angle shows the value pg0 belonging to the maximum inductance, and for the rotor angle the correct start value $px=gx0+pg0$ is obtained, to which the integrator of the transmitter 60 must be set.

According to FIG. 14, the continuous variation of gx is ensured by an oscillator 133, the pulses of which are digitally integrated in a counter 134 from a starting value pg0 on and are transformed by means of function generators 135 into the components cos (2pi f2 t), sin (2pi f2 t) of a unit vector. The setting of the transmitter 60 can then take place, e.g., in that the difference of this vector from the arbitrarily given model vector fx is formed and the integrator of the transmitter is adjusted by the output signal of a zero point regulator until quality of the two vectors is reached. Thereby the angle fx of the direction vector fx is caused to follow the angle 2pi f2, with a slight delay, until the switch 137 at the input of counter 134 is closed. How if, upon reaching the maximum value of u1, switch 137 is opened, the correct rotor position is localized and also the transmitter 60 is set to the correct start value fx=px.

For the detection of the maximum value of $|\bar{u}1^*|$ or respectively of the maximum inductance Lmax it may be advantageous according to FIG. 14 to preset first a quantity A>Lemax, which by means of an integrator 138 is reduced slowly and steadily, as illustrated in FIG. 15. At time t0, that is, at the difference angle 2pi F3 t0−gx0, the amplitude $\bar{u}1^*$ exceeds for the first time the value A, and a corresponding threshold detector 139 triggers a signal C for opening the switch 137. Thus the search process for the rotor angle px=gx0+pg0 is ended, and the transmitter furnishes the direction angle fx=px.

For the further start-up, appropriate input devices, e.g., a flux regulator and a speed regulator, for the set values i1* and i2* can now be enabled.

The method here illustrated for the case of an impressed high-frequency supplementary current component can be used also, with appropriate adaption of the control circuits and of the drive unit, for an impressed voltage component with determination of the generated current ripple. Besides, the artificial impression of an excitation with a high-frequency supplementary set value can be dispensed with, in that the two current set values i1* and i2* are maintained at zero and the unsteady mode of operation of static converter setting elements is utilized. The determining criterion then is the current ripple in the position-oriented actual current value components: The direction vector is set correctly if the ripple of the parallel actual current component is minimum and the ripple of the perpendicular actual current component is maximum.

What is claimed is:

1. Method for determining the flux angle of a rotating field machine comprising the steps of:
    a. impressing a high frequency signal on an electrical state parameter of the stator winding system, said high frequency signal being generated by a stator current converter connected to said stator winding system for rotating said machine, said electrical state parameters of the stator winding system including the currents and voltage in the individual stator coils, the axes of those coils on which the high-frequency component is impressed determining the direction of the impressed high-frequency signal;
    b. detecting a state signal which simulates another electrical state parameter of the stator winding system and determining the high frequency amplitude of said another state parameter; and
    c. determining the direction of the flux angle in the stator from said amplitude.

2. The method according to claim 1, wherein:
    a. said high-frequency signal is impressed with the machine practically standing still with an oscillating vector (iz(f1)) with a preset direction (gx) being impressed on one of two electric state vectors (is, us) of stator winding, said two electric state vectors of the stator windings including the stator current vector and the stator voltage vector;
    b. said high frequency amplitude ( u1* ) is determined from a state signal (u1*) corresponding to the other of said two vectors by rectifying and smoothing; and
    c. the flux angle (px) is determined from said amplitude ( u1* ) by presetting a limit value (A), which is correlated to a certain value (pg0) of the difference angle )px−gx) between the flux and oscillating vector; the direction (gx) of the oscillating vector being changed up to a direction angle at which the amplitude reaches the limit value; said flux angle being equal to the sum of the difference angle and the direction angle.

3. The method according to claim 1, wherein a stator current control, for which a current set value (iz(f1)*) for the high frequency signal is preset, furnishes a control signal (u1*, u2*); said control signal being used to control a voltage-impressing converter feeding the stator winding system of the machine and wherein said control signal is used for said state signal.

4. A method for the position-oriented operation of a rotating field machine by means of a position transmitter which establishes the direction vector of a rotating reference system, comprising the steps of:
    a. generating position-oriented nominal vector (i*) for one of the two electric state vectors of the stator winding, a supplementary set value (ix*) of a high frequency relative to the rotation frequency of the reference system for this state vector, and signals (fx) of the position transmitter, to form a control vector (ais, wis) for the stator, the two electric state vectors of the stator winding including the stator current vector (i) and the stator voltage vector (u);
    b. controlling a current converter by said control vector which current converter impresses on the stator windings the electric state vector corresponding to the nominal vector and to the supplementary set value;

c. detecting a state signal (u) which simulates the other of the two electric state vectors and isolating the high-frequency components of said other electric state vector; and d. generating envelope curves (FH) of the high-frequench components (FH), from which electric transmitters form the signals which establish the direction vector (fx).

5. A method according to claim 4, characterized in that the stator current vector is determined by the position-oriented nominal vector and by the supplementary set value, and a signal simulating the stator voltage vector is used.

6. The method according to claim 5, wherein the control vector is formed by regulation of the stator current vector, and the state signal simulating the stator voltage vector is formed from the control vector.

7. The method according to claim 4, wherein a supplementary high-frequency current is preset by said supplementary value in a stator winding, the state signal is determined from voltages at stator windings which are not traversed by the high-frequency current.

8. The method according to claim 5, wherein:

a. the components of a model vector describing the flux are determined from the stator voltage vector as a state signal; and (b) the amplitudes of the high-frequency portions of the model vector components are averaged over a half-period of the high frequency are formed as components of the direction vector.

9. The method according to claim 8, wherein from the deviation between the model vector (FX) and the direction vector (FH) a correction vector (DF) is formed and the model vector is adjusted by means of the correction vector until the deviation disappears.

10. The method according to claim 4, wherein the high-frequency components are rectified, smoothed, and weighted with a sign which changes after each zero crossing of their envelope curves.

11. The method according to claim 10, wherein the sign is determined from the relative phase of the isolated high-frequency component (FHa, FHb) to the high-frequency supplementary set value (iz*).

12. The method according to claim 4, wherein the fundamental wave components of the envelop curves are generated as the components of the direction vector.

13. The method according to claim 1 used for determining the rotor position of a permanently excited synchronous machine is standstill and in operation at low speeds.

14. The method according to claim 1 used for determining the field axis in standstill and in slow running of an asynchronous machine or a synchronous machine, the rotor winding of which is fed with a field current.

15. An apparatus for the operation of a rotating field machine comprising:

a. means for determining the stator voltages;

b. a band pass or low-pass filter (61) connected to said means for determining said stator voltages for isolating high frequency components of the stator voltages;

c. a mean-value-former (62) connected to said band pass or low pass filtered (67) to form the envelope curves of the high-frequency components and including means for determining the components of the direction vectors from the envelope curves;

d. a control device (65–68) connected to said mean-value former for presetting a command variable (ff*) for the components of a stator current in a reference system depending on the direction vector, and including a supplementary set value transmitter (69) for generating a high frequency supplementary set value (iz*), said control device having an output at which a control signal for the stator current can be taken off; and e. a static converter (64') connected to said control device which impresses on the stator a current corresponding to the control signal.

16. The apparatus according to claim 15, further comprising a flux calculator which calculates from the stator voltages the components of a model vector (FM) describing the flux, these components being supplied to the inputs of the band pass or high pass filter (61).

17. The apparatus according to claim 16, wherein the output signals (FH) of the mean value former and the components of the model vector (FH) are supplied to a switch (76) in a vector filter, at the output of which the components of the direction vector (fx) are taken off.

18. The apparatus according to claim 15, wherein the static converter is an intermediate link converter with impressed intermediate link voltage and with a machine-side inverter with, a pulse inverter.

19. The apparatus according to claim 15, wherein the supplementary set value acts on an actuating variable (ais) for the amplitude of the static converter output current, and that an angle discriminator (65) is provided which steps the phase of the static converter output current by 60° el upon rotation of the direction vector.

20. The apparatus according to claim 16, further comprising a tracking device (109, 111) with which the model vector (FX) is caused to follow the direction vector (FH) formed form the high-frequency components.

21. The apparatus according to claim 15, wherein the static converter is a voltage-impressing static converter and its control voltages are determined as stator voltages.

* * * * *